United States Patent Office 2,694,081

Patented Nov. 9, 1954

2,694,081

PROCESS FOR THE DECOMPOSITION OF UNSATURATED FATTY ACIDS

Werner Stein, Dusseldorf-Holthausen, and Helmut Hartmann, Dusseldorf, Germany, assignors to Henkel & Cie, G. m. b. H., Dusseldorf, Germany No Drawing. Application August 17, 1951, Serial No. 242,425

Claims priority, application Germany October 17, 1950

10 Claims. (Cl. 260—413)

Our invention relates to a new process for the decomposition of fatty acids.

More particularly, the invention relates to a process for the degradation of unsaturated fatty acids in order to prepare them for manufacturing purposes, for instance for the manufacture of cleansing preparations.

Many natural fats are of a highly unsaturated nature and are, therefore, not satisfactory for the preparation of cleansing preparations.

For improving these substances, it is possible to treat them with large excess quantities of potassium hydroxide at raised temperatures, whereby a degradation is caused by the splitting off of acetic acid and hydrogen, the resulting substances being saturated fatty acids with shorter chains.

This reaction has been known for a long time, but so far it was a considerable drawback that, at the same time, unsaponifiable decomposition products were formed; moreover, frequently the occurring discoloration proved to be an added inconvenience.

The present invention has for its object to overcome the above-mentioned inconveniences and to provide a process for the degradation of unsaturated fatty acids that is simple, inexpensive and very satisfactory in its results.

According to the present invention, this improvement is brought about by heating to high temperatures alkali metal salts of unsaturated fatty acids with caustic alkalies, which may, if desired, contain some water, and said heating is carried out in the presence of cadmium or cadmium compounds.

As caustic alkalies we may use potassium hydroxide, sodium hydroxide, or mixtures of the two hydroxides.

In order to save caustic alkalies, the fatty acids may first be neutralized with sodium carbonate or other alkali metal salts of alkaline reaction, whereafter the so obtained soaps may be treated by the process according to the present invention.

The reaction may be carried out with concentrated or aqueous caustic alkalies, even with comparatively dilute alkali solutions containing only a few per cent of alkali and up.

The conditions under which the reaction is carried out, such as temperature and time, depend on the starting material, the type of alkali used, its water contents, and the nature of the desired product. In general, it may be stated that the reaction starts, depending on the water contents, with a reaction velocity satisfactory for technical purposes, at temperatures of 250–300° C. and that it may be accelerated by further raise in temperature. It has been found that heating up to 400° C. will not deteriorate the quality of the soaps obtained in the process.

The addition of cadmium or cadmium compounds in accordance with this invention affects the course of the reaction and the quality of the product, or both, already in low amounts, of less than 5% of the fatty acid. Cadmium may be added in form of the metal, or as oxide, acetate, or in form of other compounds. During the reaction, part of the added cadmium compounds will be reduced to metal, so that in most cases the reaction will proceed in the presence of some metallic cadmium.

The addition of cadmium makes it possible to carry out the reactions under conditions, which are either not feasible or only maintained with difficulties in the absence of cadmium. For instance, the degradation according to Varrentrapp can only be carried out incompletely by caustic soda alone; however, when cadmium is added, the reaction becomes so smooth that it will be of technical importance.

Under other operating conditions, too, for instance when working with caustic potash, or caustic soda and water, the degradation becomes much more complete when carried out according to the invention, as may be recognized from the rise of the melting point and the decrease of the iodine number of the degraded fatty acids.

The process of this invention may be carried out by introducing the reaction materials in the process in batches or continuously. During the reaction hydrogen is disengaged; as soon as the evolution of this gas has ceased, the treatment can be terminated if so desired after applying a shorter or longer additional heat treatment for completion of the conversion.

In comparison to the known methods, which use considerably more caustic alkali than corresponds to the calculated amount, the process according to the present invention presents the advantage that no excess alkali has to be used in order to obtain very good results; in other words, there is a marked saving in alkali. Moreover, the resulting fatty acids have a much better color and their soaps are so light-colored that it is very often quite unnecessary to purify the fatty acids obtained from said soaps by distillation, except in cases where it is desired to separate some special fractions of the same.

Due to their light color, the absence of decomposition products, the low content in free alkali and in unsaponifiable components, the soaps obtained by the process according to the invention can be directly processed for cleansing means; it should be understood that it may be necessary to remove, before further processing occurs, any by-products formed in the reaction, such as salts of low carboxylic acids or unsaponifiable matter in case it were present. This is done in any suitable manner.

The process according to the invention thus imparts a new importance to native fats, which are rich in unsaturated fatty acids, as a source of raw materials for high grade soaps.

The process according to the invention is illustrated by a number of examples, but it is to be understood that these are given by way of illustration and not of limitation, and that many modifications of particulars may be made without departing from the spirit of the invention.

*Examples 1–4*

For carrying out the degradation, in each of the 4 examples 100 grams of fatty acid derived from soya bean oil are heated in an autoclave with caustic alkali powder for four hours. The acid has an acid number of 203, an iodine number of 107, and a saponification number of 210. The amount of alkali used is in all cases 105% of the calculated amount, including the quantity of alkali needed for neutralization of the fatty acids present at the start and also of the acetic acid newly formed, of which one molecule is formed per each double bond, under the assumption that complete degradation occurs. The powder used is technical caustic potash or caustic soda containing 85–88% of alkali. The tests were made in an autoclave of V2A-steel, which was, in part of the tests, provided with a copper insert and stirring device. The copper parts had been covered by a coating of cadmium in previous operations. The degraded fatty acid was obtained by acidifying the aqueous solution of the reaction product. The conditions, under which the reaction proceeded in each case, and the characteristics of the fatty acids obtained are tabulated herewith.

| Example | Autoclave | Reaction mixture: 100 g. Fatty Acid | | | Temperature, ° C. | Characteristics of the Fatty Ac. | | | |
|---|---|---|---|---|---|---|---|---|---|
| | | g. NaOH | g. KOH | g. addition | | Acid No. | Saponif. No. | Iodine No. | Solidif. Point |
| 1 | V2A | 37 | | | 300 | 208 | 216 | 57 | 28.0 |
| | Cu/Cd | 37 | | 3CdO | 300 | 214 | 220 | 41 | 32.2 |
| | Cu/Cd | 37 | | s$CdI_2$ | 300 | 215 | 217 | 37 | 32.9 |
| 2 | V2A | 18.5 | 26.8 | | 300 | 217 | 221 | 39 | 32.6 |
| | Cu/Cd | 18.5 | 26.8 | 3CdO | 300 | 221 | 224 | 22 | 37.4 |
| | Cu/Cd | 18.5 | 26.8 | | 300 | 220 | 227 | 20 | 38.5 |
| 3 | V2A | 33.3 | 5.3 | | 300 | 212 | 215 | 52 | 29.3 |
| | Cu/Cd | 33.3 | 5.3 | 3CdO | 300 | 217 | 218 | 28 | 33.7 |
| 4 | V2A | 18.5 | 26.8 | | 350 | 219 | 223 | 26 | 35.9 |
| | Cu/Cd | 18.5 | 26.8 | 3CdO | 350 | 220 | 223 | 12 | 38.7 |

*Example 5*

350 grams of waterfree fatty acid from soya bean oil, obtained by saponifying 300 grams of said acid with a 30% soda solution, and subsequent drying of the soap in vacuo, were heated in an autoclave, provided with a cadmium-coated copper insert and stirrer, with a solution of 54 grams of caustic soda in 320 grams of water and an addition of 6 grams CdO to 385° C. for two hours. The pressure in the autoclave was maintained at 220 atm. by blowing off. The processed fatty acid had the following characteristics: iodine number = 25, solidifying point = 35.8.

What we claim is:

1. A process for the degradation of unsaturated higher fatty acids which comprises heating the alkali metal salts of said acids with caustic alkalies in the presence of cadmium.

2. The process set forth in claim 1, wherein the reaction mixture is heated to temperatures between 250–400° C.

3. The process set forth in claim 1, wherein the treatment is carried out in vessels lined with cadmium.

4. The process set forth in claim 1, wherein the reaction is performed in the presence of water.

5. The process set forth in claim 1, wherein caustic soda is used as a caustic alkali.

6. The process set forth in claim 1, wherein the caustic alkalies consist of a mixture of caustic soda and caustic potash.

7. The process set forth in claim 1 wherein the amount of alkali present is up to 10% in excess of the calculated value of alkali needed.

8. A process for the degradation of unsaturated higher fatty acids which comprises neutralizing said fatty acids by an alkali metal salt of alkaline reaction and thereafter treating the soaps obtained thereby with caustic alkalies in the presence of cadmium at temperatures between 250 and 400° C.

9. A process for the degradation of unsaturated higher fatty acids, which comprises heating the alkali metal salts of said acids with caustic alkali in the presence of metallic cadmium derived in the course of the reaction from a cadmium compound yielding the same.

10. A process for the degradation of unsaturated higher fatty acids, which comprises heating the alkali metal salts of said acids with caustic alkali in the presence of metallic cadmium derived in the course of the reaction from a cadmium compound selected from the group consisting of cadmium oxide, cadmium iodide and cadmium acetate.

References Cited in the file of this patent

UNITED STATES PATENTS

| Number | Name | Date |
|---|---|---|
| 1,429,114 | Stiepel | Sept. 12, 1922 |
| 2,435,159 | Ross | Jan. 27, 1948 |